Feb. 11, 1969 R. SCHNEIDER ET AL 3,427,003
APPARATUS FOR MIXING AND HOMOGENIZING VISCOUS LIQUIDS
Filed June 21, 1967

INVENTORS:
RUDOLF SCHNEIDER, LUDWIG BOTTENBRUCH, OTTO COURT, WALTER DAMSKY, GEORG SPOTT, AXEL LIPPERT.
BY
ATTORNEYS

United States Patent Office 3,427,003
Patented Feb. 11, 1969

3,427,003
APPARATUS FOR MIXING AND HOMOGENIZING VISCOUS LIQUIDS
Rudolf Schneider and Ludwig Bottenbruch, Krefeld-Bockum, Otto Court, Neuss, Walter Damsky, Krefeld, Georg Spott, Krefeld-Urdingen, and Axel Lippert, Krefeld-Bockum, Germany, assignors to Farbenfabriken Bayer Aktiengesellschaft, Leverkusen, Germany, a corporation of Germany
Filed June 21, 1967, Ser. No. 647,722
U.S. Cl. 259—9  10 Claims
Int. Cl. B01f 7/02; B29f 3/02

ABSTRACT OF THE DISCLOSURE

Mixing apparatus for the continuous mixing and homogenizing of flowable substances, e.g. viscous liquids and liquids containing pulverulent materials, including a tubular housing, a mandrel rotatably disposed therewithin, a first inner conveying thread extending in a first spiral direction and a second outer conveying thread extending in a second spiral direction counter to the first spiral direction, said threads defining correspondingly first and second spiral channels and said threads correspondingly contacting one another at points of intersection so as to form apertures therebetween which flow communicate the first and second channels, the threads being mounted on the mandrel for common rotation therewith, e.g. with the first inner thread disposed in abutting relation with the mandrel along their common extent and with the second outer thread disposed operatively in slidable abutting relation with the housing along their common extent, whereby upon rotation of the mandrel the flowable substance in the housing is divided into separate flows correspondingly conveyed along the channels at closely disposed spiral paths and in intermittent partial exchange flow contact at the apertures to achieve maximum intermixing between the layers in the channels and at the apertures during travel of the flowable substance along the course from the inlet portion to the outlet portion of the housing.

The present invention relates to a process for the continuous mixing and homogenizing of viscous liquids or of liquids containing pulverulent substances, in which the flow of the material which is to be mixed is conveyed in the form of a number of partial flows through a mixing zone. In the known processes of this type, the material to be mixed is conveyed by means of screws provided with special mixing zones which take the form of annular gaps, nozzle plates or counter threaded members.

It is also known that the mixing effect may be increased by removal of part of the flow of material to be mixed and by returning it to a zone of the screw that lies further back in the direction of flow.

Furthermore, single shaft screws are known in which the shaft is reciprocated axially at the same time that it is rotated, pegs being arranged both on the shaft and on the inner wall of the housing in such a way that they constantly move with respect to each other during operation, thereby exerting a kneading action on the material being mixed.

In all these apparatuses, the mixing is effected by building up of pressure and counterpressure, the parabolic movement of transport produced by the pressure being superimposed by frictional transverse and backward movement of the material being mixed. The material being mixed is vigorously moved at random in each and every direction. This requires high usage of energy, and leads to the material to be mixed being heated in the positions of high shear gradients, this causing damage to temperature sensitive materials.

It has now been found that these disadvantages may be overcome if the flow of the material to be mixed is divided, the separate flows being, conveyed according to the present invention, through a mixing zone in which different layers are arranged close to one another the layers being provided with a large number of channels arranged side by side in each layer and the partial flows in any one layer being carried across the partial flows of other layers but in the same general direction of flow, which flows pass over openings situated at the points of intersection of the channels of one layer with those of another layer, so that the intersecting streams of the two levels can communicate with each other through these openings. An apparatus for carrying out the process is provided with groups of channels arranged in parallel levels which channels in one layer cross channels in other layers, the channels of the different layers communicating with each other through apertures at the points of intersection thereof.

By conveying a large number of partial flows in layers which cross each other in such a way that the partial flows from the different layers can mix at the points of intersection of the channels a highly efficient mixing effect is achieved without great expenditure of energy and hence without damage to temperature sensitive materials. In particular, it is possible to achieve transfer of material from one partial flow to another in a direction transverse to the main direction of flow by applying relatively small pressure differences between the individual partial flows e.g. by forming the intersecting channels so that they alternately constrict and widen in the direction of flow.

A preferred embodiment of the apparatus for carrying out the process comprises a sleeve which can be inserted into a tube and which can be mounted on a mandrel or a displacement member. According to the preferred embodiment, this sleeve is provided with an external thread and an internal thread which are arranged so that they are intertwined, and the two threads are cut so deep into the sleeves that the turns of the two threads are in direct communication with each other between the points of intersection of the threads.

The layered cross-threads can be arranged on any rotating body.

Examples of apparatuses which may be used for carrying out the process according to the invention are illustrated diagrammatically in the accompanying drawings in which.

Figure 1:
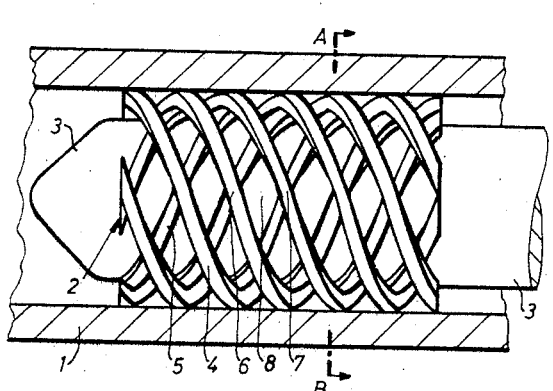
FIGURE 1 shows a longitudinal section through a cross threaded sleeve which is mounted inside a tube and which is perforated between the points of intersection of the threads.
Figure 2:
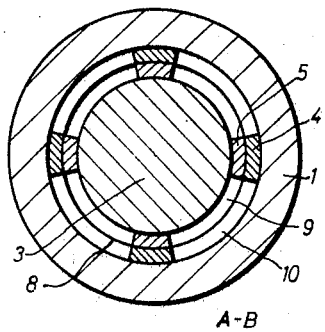
FIGURE 2 shows a cross section A–B through the apparatus of FIGURE 1.

Referring to the figures, the apparatus comprises a conveyor tube 1, provided with an internal sleeve 2 provided with cross thread, and a mandrel 3 inserted in the sleeve. Screw threads are cut into the sleeve from outside and inside as channels for the partial streams, the external threads running clockwise in the direction of flow and the internal threads counter-clockwise. The elevations 4 of the external thread pass over and intersect with the elevations 5 of the internal thread. The threads are cut so deep into the sleeve from inside and outside that perforations 8 are formed between the points of intersection 6 and 7 of the two threads. The mixing apparatus may also consist of two sleeves mounted one inside the other, the internal sleeve having an external thread cut into it whilst the external sleeve consists only of thread elevations which extend in such a direction that they cross the elevations of the external thread of the internal sleeve.

The threads 4, 5 cut out of the sleeve and intersecting each other, each consisting of several turns, may also be regarded as two helices of several turns so arranged that the turns of the two helices intersect and the two helices communicate with each other between the points of intersection 6, 7. The mixing apparatus will for this reason be called "intersecting helices" hereinafter.

Figure 4:
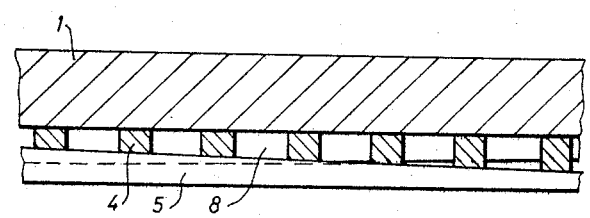
FIGURE 4 shows a section through a modification of the sleeve development of FIGURE 3 in the direction of one of the thread spirals in which the channels of the different layers alternately widen and narrow in the direction of flow.

The exchange of material from the partial flows in the intersecting helices can be increased by making the channels of one helix system continuously diminish in cross-section along the direction of flow while the cross-section of the intersecting channels of the other system progressively increases. FIGURE 4 shows such a possibility in section along one turn of the screw. By this means, part of the stream in the channels of diminishing cross-section will mix with the stream in the channels of increasing section. The same effect can also be achieved by making the screw 4 wedge-shaped in one direction and the screw 5 wedge-shaped in the other direction, or by making the sleeve conical.

Figure 3:
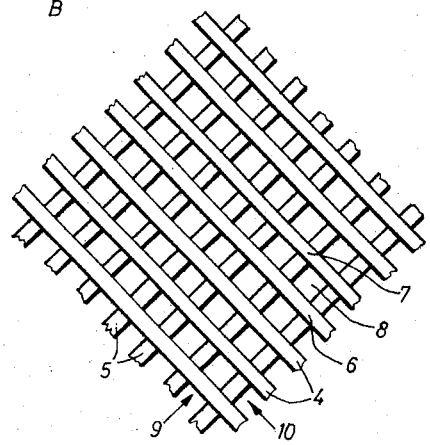
FIGURE 3 shows a development of the sleeve of FIGURE 1.
Figure 5:
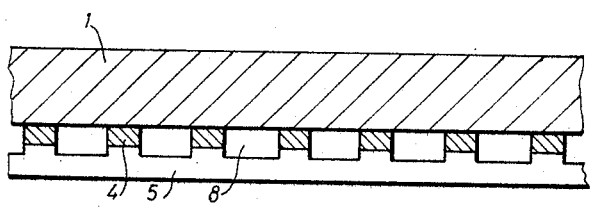
FIGURE 5 shows a section through a modification of the sleeve development of FIGURE 3 along a screw thread, i.e. in the direction of one of the thread spirals, in which the external thread is cut deeper than the internal thread.

Another means of causing flow from one set of channels to the other in an orderly fashion is illustrated in FIGURE 5. The internal cross-section of the channels 10 is increased by making the channels cut into the channels 9 (FIGURE 3). This causes part of the material flowing through the channels 9 (FIGURE 3) to be sheared off by the intersecting flow of the channels 10 and carried along with it. A combination of any of these means may be used.

Figure 6:
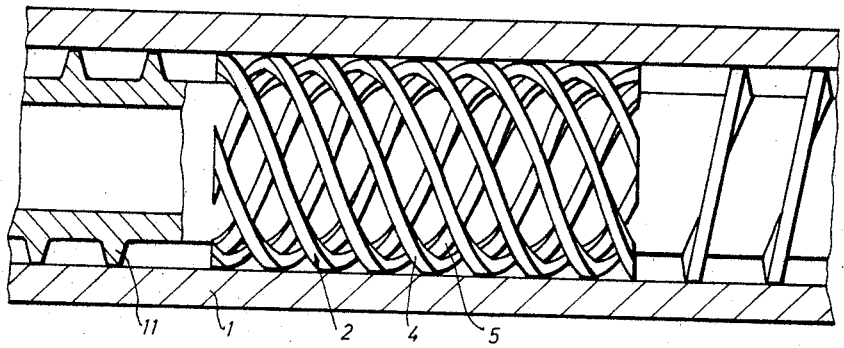
FIGURES 6, 7 and 8 show possible applications of the cross-threaded sleeve according to the invention in conjunction with single shaft conveyer screws.

Another application of the intersecting helices 2 is shown in FIGURE 6. The intersecting helices are 2 tightly fitted on to the core 11 of a screw. The outer helix of the intersecting helices 2 can be designed for passage of material forwards or backwards. Owing to friction of the fluid material against the wall of the housing 1, the material carried in the outer helix 4 is brought to a different pressure to that of the material passing through the inner helix 5, so that there is a constant overflow of partial flows at the open points of intersection of the spirals.

Figure 7:
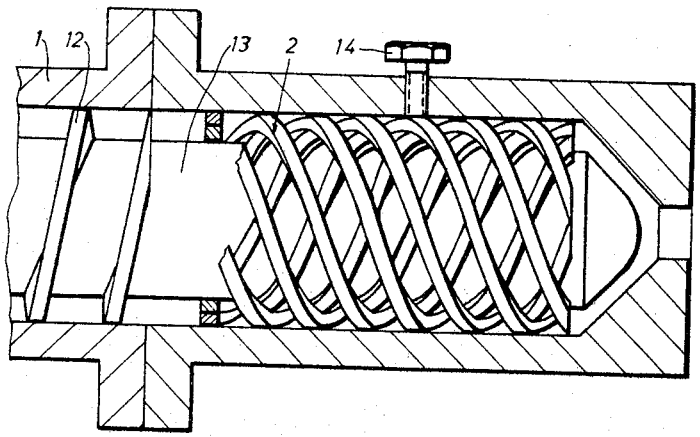

Another application of the cross-spiral 2 is shown in FIGURE 7 where a screw conveyor element 2 is firmly fixed into the stationary housing 1 by means of a screw or bolt 14. The free, unthreaded shaft end 13 of the screw 12 rotates inside the intersecting helices. In this case, in contrast to the preceding example, the fluid material is conveyed under pressure through the outer helix whilst the inner helix mixes the material by working forwards or backwards, owing to rotation of the shaft.

Figure 8:
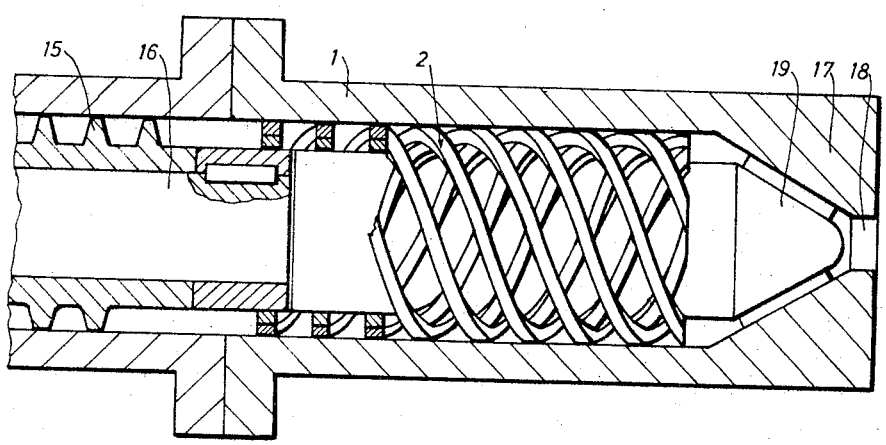

Another application of the intersecting helices is shown in FIGURE 8. In this case, the intersecting helices 2 are fixed as an end piece behind the last turn 15 on a shaft 16 so that it rotates with the shaft. The cylindrical mandrel 19 is fixedly connected to a head piece 17 which terminates in an aperture 18 for discharge of material. In this case, both the internal and the external helices function as conveyor screws, one in the direction of delivery and the other in the opposite direction. The resulting pressure differences again cause exchange of material through the apertures between the intersections of the helices.

All the above mentioned measures may be carried out either singly or combined, or together with other known means for mixing fluids.

The arrangement described can be constructed with the threads of the screws at different angles to each other, with threads of different thicknesses, and channels of different cross-sectional areas, with localised differences in thickness of thread or channel, in the form of rotary members (e.g. cylindrical or conical) and planes (e.g. as double plate) with intersecting threads for the final homogenization of materials to be used in the production of foils. The apparatus may either be kept in motion during operation or be used as a stationary member which is immersed in the liquid and through which the substance is conveyed under pressure.

We claim:

1. Mixing apparatus for the continuous mixing and homogenizing of flowable substance such as viscous liquids and liquids containing pulverulent materials which comprises a tubular housing having an interior wall surface, an inlet at one end portion and an outlet at the other end portion, and a mandrel having an exterior wall surface rotatably disposed within said housing, said mandrel having a first inner conveying thread extending in a first spiral direction to define a first spiral channel and a second outer conveying thread extending in a second spiral direction counter to said first spiral direction to define a second spiral channel counter to said first spiral channel and forming with said first thread corresponding contact points of intersection as well as apertures between said channels, said threads being mounted on said mandrel for common rotation therewith, the inner periphery of said first inner thread correspondingly substantially abutting the mandrel exterior wall surface along their common extent and the outer periphery of said second outer thread correspondingly substantially operatively slidably abutting the housing interior wall surface along their common extent, whereby upon rotation of said mandrel such flowable substance in said housing is divided into separate flows correspondingly conveyed along said first spiral channel and said second spiral channel in closely disposed spiral layers and in intermittent partial exchange flow contact at said apertures to achieve maximum intermixing between said layers in said channels and at said apertures during travel of said flowable substance along the course from said inlet portion to said outlet portion.

2. Apparatus according to claim 1 wherein said first and second threads each have a uniform radial thickness, and said first and second channels each correspondingly have a uniform flow cross-section.

3. Apparatus according to claim 1 wherein at least one of said first and second threads decreases in radial thickness in the direction of flow travel from said inlet portion to said outlet portion, and the corresponding at least one of said first and second channels correspondingly decreases in flow cross-section in said direction of flow travel.

4. Apparatus according to claim 1 wherein one of said first and second threads decreases in radial thickness and the other of said first and second threads increases in radial thickness in the direction of flow travel from said inlet portion to said outlet portion, and the corresponding one of said first and second channels correspondingly decreases in flow cross-section and the corresponding other of said first and second channels correspondingly increases in flow cross-section in said direction of flow travel.

5. Apparatus according to claim 1 wherein one of said first and second threads is provided with raised contact surfaces at spaced apart intervals therealong coinciding substantially with said contact points of intersection and abutting thereat with the corresponding portions of said other of said first and second threads, whereby to enlarge radially the apertures between said channels and increase the intermixing between said layers in said channels and at said apertures.

6. Apparatus according to claim 5 wherein said first thread is the thread which is provided with said raised contact surfaces.

7. Apparatus according to claim 1 wherein said first thread and said mandrel are integral.

8. Apparatus according to claim 2 wherein said first and second threads are integral at said points of contact.

9. Apparatus according to claim 1 wherein said mandrel is provided with a sleeve disposed thereon which defines the mandrel exterior wall surface and said first thread is mounted on said sleeve and is integral therewith, and wherein said first and second threads are integral at said points of contact.

10. Apparatus according to claim 1 wherein said mandrel is operatively connected with a conveyor screw within said housing.

References Cited

UNITED STATES PATENTS

| | | |
|---|---|---|
| 2,744,287 | 5/1956 | Parshall et al. |
| 3,067,987 | 12/1962 | Ballou et al. _ _ _ _ _ _ 259—9 XR |

WALTER A. SCHEEL, *Primary Examiner.*

JOHN M. BELL, *Assistant Examiner.*

U.S. Cl. X.R.

18—12